United States Patent
Elliott et al.

(10) Patent No.: US 7,167,330 B2
(45) Date of Patent: Jan. 23, 2007

(54) OVER-WRITING DATA IN A RECORDING SYSTEM

(75) Inventors: Carl F. Elliott, Eden Prairie, MN (US); Hao Fang, Savage, MN (US); Ross S. Wilson, Menlo Park, CA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 11/100,162

(22) Filed: Apr. 6, 2005

(65) Prior Publication Data

US 2006/0227446 A1 Oct. 12, 2006

(51) Int. Cl.
G11B 5/03 (2006.01)

(52) U.S. Cl. .......................... 360/66; 360/65; 360/53; 360/48

(58) Field of Classification Search .................. None
See application file for complete search history.

(56) References Cited

U.S. PATENT DOCUMENTS

| | | | | |
|---|---|---|---|---|
| 4,851,933 A | * | 7/1989 | Sugaya et al. | 360/61 |
| 5,353,170 A | * | 10/1994 | Fung et al. | 360/53 |
| 5,475,540 A | * | 12/1995 | Gold | 360/48 |
| 6,119,201 A | * | 9/2000 | Kulakowski et al. | 711/112 |
| 6,147,827 A | * | 11/2000 | Southerland et al. | 360/53 |
| 6,366,418 B1 | * | 4/2002 | McEwen et al. | 360/48 |
| 6,577,460 B1 | * | 6/2003 | Hanson | 360/40 |
| 6,621,648 B2 | | 9/2003 | Elliott et al. | 360/45 |
| 6,671,114 B2 | * | 12/2003 | Bang | 360/48 |
| 6,678,106 B2 | * | 1/2004 | Hoskins et al. | 360/48 |
| 6,900,955 B2 | * | 5/2005 | Coonen | 360/48 |
| 6,947,232 B2 | * | 9/2005 | Lim et al. | 360/31 |
| 2001/0033444 A1 | * | 10/2001 | Tomiyama et al. | 360/29 |
| 2002/0003675 A1 | * | 1/2002 | Tomiyama et al. | 360/53 |
| 2003/0193729 A1 | * | 10/2003 | Shimokoshi | 360/53 |
| 2005/0078399 A1 | * | 4/2005 | Fung et al. | 360/69 |

* cited by examiner

*Primary Examiner*—Wayne Young
*Assistant Examiner*—Dismery Mercedes

(57) ABSTRACT

A recording system stores recording cycle information identifying the parameters for recording user data on a particular data sector. During a subsequent operation, the recording system employs the recording cycle information to select a different set of parameters for recording new user data at the particular data sector. One of the parameters might identify a recorded pattern in a balance pad at the data sector, and another one of the parameters might identify a scrambler seed value. By employing a different set of recording parameters for each occurrence of recording user data at the particular sector, sample timing of, for example, a read channel might be based on an average of easy and hard transitions.

20 Claims, 7 Drawing Sheets

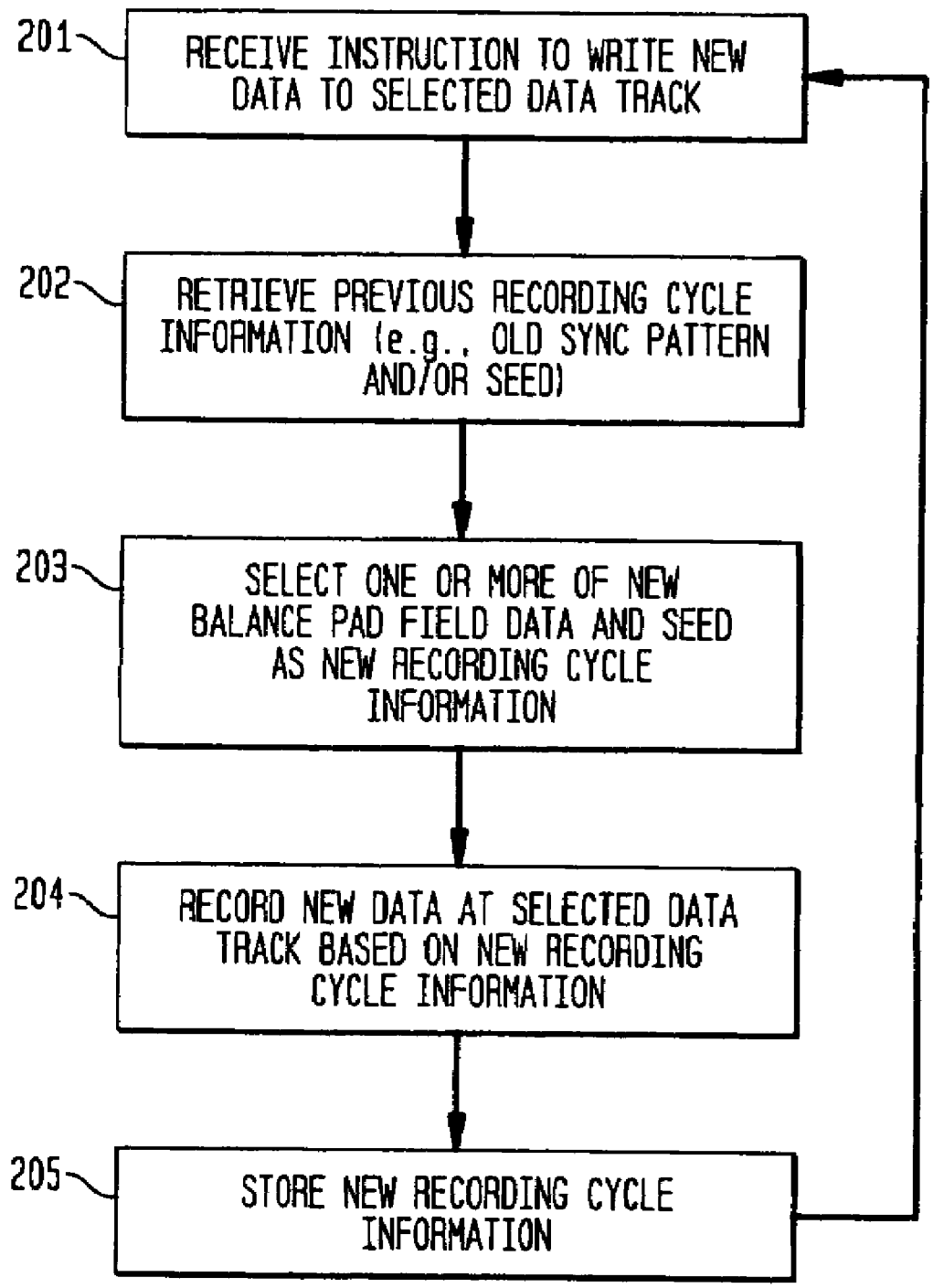

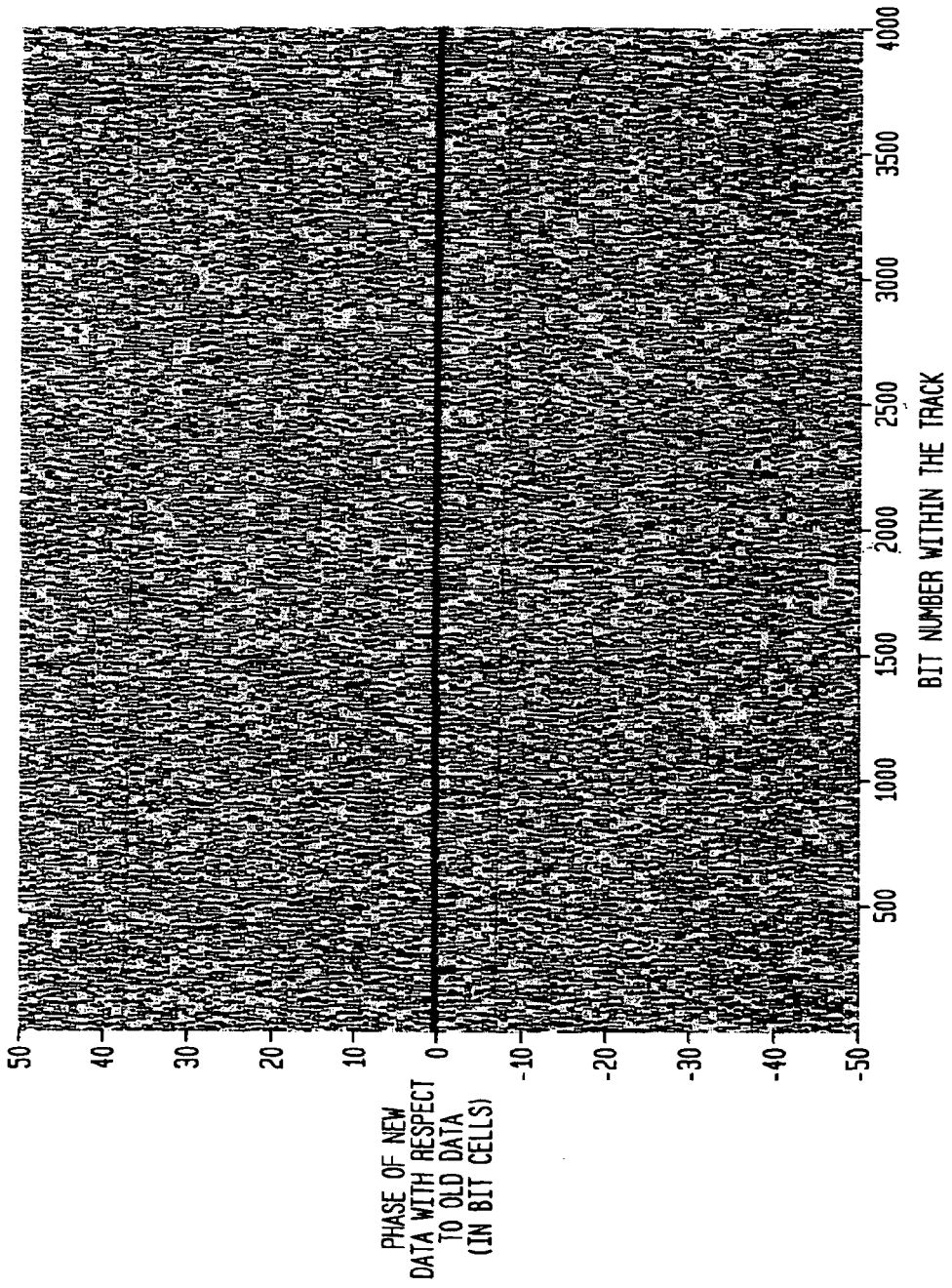

OVER-WRITING DATA IN A RECORDING SYSTEM

BACKGROUND OF THE INVENTION

1. Field of the Invention

The present invention relates to data recording in a communications system, and, more particularly, to writing information from a channel to a recording medium.

2. Description of the Related Art

Conventional recording systems of the prior art encode data and write the encoded data to a recording medium, such as a magnetic hard drive or an optical recording disk. The encoded data is written to the disk (or other recording medium) by a read/write head (e.g., a magnetic recording/playback head). A read channel component is an, e.g., integrated, circuit of a computer hard disk (HD) drive that encodes, detects, and decodes data, enabling the head to correctly i) write data to the disk drive and ii) read back the data. The disks in an HD drive have a number of tracks, each track consisting of i) user (or "read") data sectors and ii) control (or "servo") data sectors embedded between the read sectors. Information stored in the servo sectors is employed to position the head over a track so that the information stored in the read sector can be retrieved properly. Sectors are identified by assigned sector numbers.

In a magnetic recording system, data is recorded by varying the magnetic field over a bit position ("cell") on the surface of the recording disk. A write bubble is defined as a region within a write-head-induced field where the field intensity is greater than the recording media's coercivity. A transition is formed when the backward expansion of the trailing edge of the write bubble begins to slow down, and eventually is slower than the differential velocity between the head and the medium. The point in time when the bubble expansion rate equals the differential velocity between the head and the medium is the point in time when the transition is formed. The position on the disk of the transition is the location of the trailing edge of the write bubble at that point in time.

FIG. 1A is a diagram illustrating "write bubble" 10 created by write head 12 to magnetically record information on disk 14. See U.S. Pat. No. 6,621,648 B2, the teachings of which are incorporated herein by reference. Write head 12 is configured in a manner well known in the art, and is operable with appropriate write driver circuitry 13 to generate magnetic fields of first and second opposite polarities in response to binary data signals for recording onto disk 14. A data-encoding scheme well known in the art is the Non-Return-to-Zero Inverted (NRZI) encoding scheme, in which a magnetic transition recorded on the disk signifies a binary "one" and the lack of a magnetic transition recorded on the disk signifies a binary "zero." The region in which the magnetic field is generated is shown as write bubble 10, which is defined as the region in which the magnetic field generated by write head 12 is strong enough to magnetically record on disk 14. Write bubble 10 extends to lateral edges 16a and 16b on disk 14. The tracks of disk 14 move past write head 12 in a direction and at a velocity indicated by the arrow labeled $V_{medium}$. The arrows shown on disk 14 indicate the direction of magnetization of the disk, as recorded by the magnetic field in write bubble 10.

When writing new data over old data on a disk, the magnetization pattern of the new data interacts with the magnetization of the old data. When the leading edge of the write bubble extends into old data, if the polarity of the old data is the same as the polarity being presently induced by the write head, then the transition formed in the media is called an "easy" transition. If, however, the polarity of the old data is opposite that being presently induced by the write head, then the transition formed in the media is called a "hard" transition. Hard transitions are shifted in time relative to easy transitions. These timing shifts can cause degradation in the overall signal-to-noise ratio (SNR) of the magnetic recording system.

FIG. 1B shows a data sector 100 of a prior art magnetic recording system having synchronization (sync) field 101 and user data 102. Sync field 101 is a portion of the data sector, prior to user data 102, that allows the disk drive read channel's phase-lock loop (PLL) to adjust to the desired sample rate to sample points within the disk drive data. The sync field is typically a relatively long interval having a predefined pattern of alternating polarity. A common pattern is an alternating 2T pattern having a period of alternating polarity at two times the minimum bit cell time (i.e., 00110011 . . . , NRZ format).

If a "new" alternating 2T pattern is written over an "old" (i.e., previously recorded) alternating 2T pattern, the typical result is that either i) all of the transitions in the sequence are hard or ii) all of the transitions in the sequence are easy. In either case, when reading the data back, the read clock synchronizes its sampling time (or phase) to one extreme (e.g., the time (or phase) of the hard transitions) or the other extreme (e.g., the time (or phase) of the easy transitions), while the user data that follows the sync field typically has a random distribution of both hard and easy transitions. In such a case, read errors can result from using the skewed read clock derived during the sync field to read data at the start of the user data field.

Prior art methods to reduce the disadvantageous effects of overwriting an alternating 2T pattern with another alternating 2T pattern make the write bubble large enough to minimize interaction of demagnetization fields at the leading and trailing edges of the write bubble. However, as disk drive systems are scaled to smaller sizes, the size of the write bubble doesn't grow. Instead, newer recording systems require smaller write bubbles that make the overwrite problem worse. Also, effects on the recording quality due to the overwrite problem are inversely proportional to the minimum bit cell time (proportional to the data rate).

Another overwrite problem that can exist is when the user data field is overwritten with the same set of data that was previously recorded. As a result of the effect of spindle-speed variations on the phase of written data, the resulting new data can have relatively long intervals of all easy transitions interleaved with relatively long intervals of all hard transitions. During each long interval, the read clock tends to get skewed to the corresponding extreme. This can lead to read errors when moving from an interval of all easy transitions to an interval of all hard transitions, and vice versa.

SUMMARY OF THE INVENTION

The Background of the Invention described two related overwriting problems: one related to overwriting an old 2T pattern with a new 2T pattern in the sync field and the other related to overwriting old user data with the same new user data in the user data field. In both cases, the new data contains one or more relatively long sequences of all easy and/or all hard transitions. During reading operations, each long sequence can result in a skewed read clock that can cause read errors when reading the data that follows the long sequence. The present invention is directed to overwriting techniques that tend to ensure that the new data is represented on the magnetic recording medium with a mix of both easy and hard transitions, thereby avoiding the occurrence of long sequences of either all easy or all hard transitions. The mix of both easy and hard transitions tends to ensure that the read clock will not be skewed to one side or the other, thereby reducing read errors that might otherwise occur when reading using a skewed read clock.

In accordance with exemplary embodiments of the present invention, a recording system stores recording cycle information identifying one or more parameters used to record data on each data sector of a recording medium, such as a magnetic disk. During a subsequent recording operation in which the old data is overwritten with new data, the recording system retrieves the corresponding recording cycle information for the old data to select a different set of parameters for recording the new data over the old data. Employing a different set of recording parameters each time new data is written over old data for a particular sector tends to ensure that the new data will be represented by a mix of easy and hard transitions. Depending on the implementation, the recording parameters may include one or both of (1) the type of alternating data pattern recorded at the end of the sector's sync field and (2) the scrambler seed value used to record user data in the sector's user data field. As explained in the Detailed Description, changing the type of alternating data pattern recorded in a "balance pad" at the end of the sector's sync field can prevent the end of the sync field from having all easy or all hard transitions and thereby avoid read errors at the start of the user data field resulting from a skewed read clock. Similarly, changing the scrambler seed value used to record user data in the sector's user data field can prevent interleaved runs of easy or hard transitions when old data is overwritten with the same, new data and thereby avoid read errors within the user data field.

In one embodiment, the present invention is a method and apparatus for recording a new set of data over an old set of data at a data sector of a recording medium. A set of recording cycle information used to record the old set of data is determined. A different set of recording cycle information is selected for the new set of data, and the new set of data is recorded at the data sector using the different set of recording cycle information.

In another embodiment, the present invention is a channel component for a recording system for recording a new set of data over an old set of data at a data sector of a recording medium of the recording system. The channel component comprises a write head and a write driver. The write head is adapted to write the new set of data over the old set of data at the data sector of the recording medium, and the write driver is adapted to control operations of the write head. The write driver is adapted to (a) determine a set of recording cycle information used to record the old set of data; (b) select a different set of recording cycle information for the new set of data; and (c) control the write head such that the new set of data is recorded at the data sector using the different set of recording cycle information.

BRIEF DESCRIPTION OF THE DRAWINGS

Other aspects, features, and advantages of the present invention will become more fully apparent from the following detailed description, the appended claims, and the accompanying drawings in which:

FIG. 2 shows a method of recording a data sector in accordance with exemplary embodiments of the present invention;

FIG. 8 shows an exemplary track for a simulation in which a random seed is employed to overwrite random data with new random data.

DETAILED DESCRIPTION

FIG. 2 shows a method of recording data in a data sector of a magnetic recording medium, in accordance with exemplary embodiments of the present invention. At step 201, the method receives an instruction to write new data to a selected data sector of a recording medium. At step 202, the method retrieves one or more previous parameters of recording cycle information employed to write previous user data to the selected data sector. Recording cycle information might include one or more of an old balance pad pattern and an old scrambler seed values employed to record the old data on the selected sector. Balance pad patterns and scrambler seed values are described in further detail below. At step 203, based on the recording cycle information, the method selects new parameters for recording cycle information corresponding to the data sector, such as one or more of a new balance pad pattern and a new scrambler seed value. At step 204, the method records the new data at the selected data sector on the recording medium in accordance with the new parameters. At step 205, the method stores the new parameters for the recording cycle information corresponding to the data sector for later use by the method. From step 205, the method returns to step 201 for the next set of new data to be recorded to a new selected data sector.

Figure 1A:
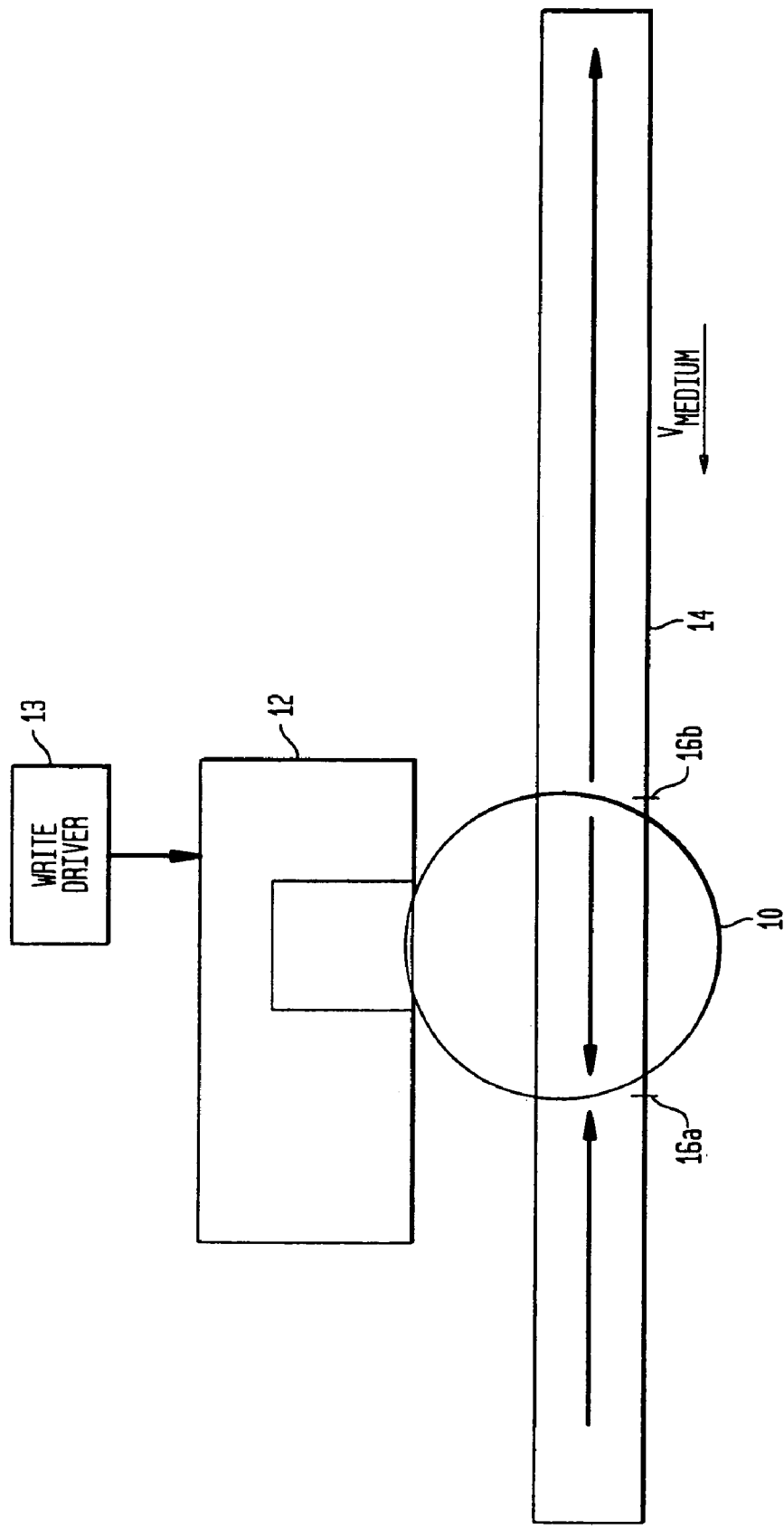
FIG. 1A shows a write bubble of a prior art magnetic recording system.
Figure 1B:
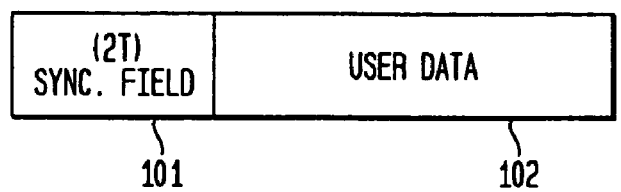
FIG. 1B shows a data sector of a prior art magnetic recording system subject to the write bubble of FIG. 1A.
Figure 3:
FIG. 3 shows an exemplary data sector employed with a first exemplary embodiment of the method of FIG. 2.

In accordance with a first exemplary embodiment of the present invention, a balance pad is inserted between a sync field and user data in a data sector of a recording medium. FIG. 3 shows a portion of exemplary data sector 300 employed with the method of FIG. 2. Data sector 300 comprises sync field 301, balance pad field 302, and user data 303. Sync field 301 comprises a predefined pattern that identifies the beginning of recorded user data in a data sector, and allows for recovery of sample timing for, for example, the read channel. Sync field 301 might typically be an alternating 2T pattern, where the 2T pattern is a pattern of alternating polarity at two times the minimum bit cell time (i.e., 00110011 . . . ).

Balance pad field 302 includes a pattern that is modified each time the balance pad field is recorded. By appropriately modifying the recorded pattern in the balance pad field each time the balance pad field is recorded, an even mixture of hard and easy transitions tends to occur on the medium.

The inventors have determined from simulation that, for example, a 2T sequence overwriting a 3T sequence, or a 3T sequence overwriting a 2T sequence, results in an even mixture of hard and easy transitions on the medium within the recorded information, where the 3T pattern is a pattern of alternating polarity at three times the minimum bit cell time (i.e., 000111000111 . . . ). Consequently, balance pad field 302, each new time it is written, alternates between a 2T pattern and a 3T pattern. Thus, balance pad field 302 exhibits a mixture of hard and easy transitions that may, for example, balance a read clock to a desired center sampling frequency before a read channel begins sampling user data 303.

An operating system for a processor of, for example, the read channel stores parameters indicating that the previous write on the selected data sector included a 2T balance pad field or a 3T balance pad field. If the previous write used a 2T balance pad field, then the new write uses a 3T balance pad field. If the previous write included a 3T balance pad field, then the new write uses a 2T balance pad.

A phase-locked loop (PLL) controls the frequency of sample timing of the read channel. During "acquire mode," the PLL varies the frequency of sample timing in an attempt to match i) the sample timing recovered from the signal read from the recording medium to ii) the timing of the sync field (preamble) pattern. In acquire mode, the channel PLL employs a priori knowledge of the sync field pattern in order to reduce the probability of mis-lock; high gain is used to reduce PLL pull-in time. The PLL transitions from acquire mode to "high-gain track mode" within sync field 301 after sufficient time has elapsed to secure lock to the sync field 301. During high-gain track mode, the PLL employs coarse tracking of the sample timing recovered from the signal read from sync field 301. In high-gain track mode, the PLL reference is switched in the channel from the forced sync field pattern to tentative decisions furnished, for example, by early stages of a maximum-likelihood data detector. PLL gain is maintained high to enhance tracking. The PLL is therefore in a high-gain track mode just prior to, or during, the period when the read channel reads data of balance pad field 302; hence, the PLL will rapidly self-adapt to the balance pad pattern. As already described, the balance pad frequency differs from the sync field frequency; hence, use by the PLL of tentative decisions is warranted.

Customarily, the user data field 303 is prefaced with a synchronization character to demark the onset of data. A variant of the present invention places this character at the leading edge of balance pad field 302, and selects the character for maximum detectability in the presence of PLL misphasing arising from hard/easy transition effects.

After balance pad field 302 is read, the PLL is switched into "low-gain track mode" in anticipation of reading user data field 303. In this mode, PLL gain is reduced to a value reflecting an optimum tradeoff between noise immunity and phase error, and the PLL remains in decision-directed mode based on tentative data decisions from the data detector.

While FIG. 3 shows a specific order for sync field 301, balance pad field 302, and user data 303, the present invention is not so limited. One skilled in the art would realize that additional fields might be inserted between those shown, and that the order of the fields might also be modified depending on the application.

In one implementation, the data pattern used for the balance pad field can be stored somewhere in the recording system for subsequent access by the write driver. Alternatively, the write driver can determine the data pattern directly by detecting the actual pattern stored in the balance pad field.

In accordance with a second exemplary embodiment of the present invention, a pseudo-random sequence generator seed value (i.e., scrambler seed value) is varied each time user data is recorded to a data sector. The scrambler seed is loaded into a feedback shift register that is employed to scramble user data written to a data sector. User data is logically combined with the pseudo-random bit sequence generated by the feedback shift register to ensure that the data appears to be a pseudo-random bit sequence, reducing the occurrence of repeating bit patterns in the user data that is recorded to the data sector. By changing the seed each time user data is written to the data sector, the phase where a run of easy transitions occurs is shifted, thus reducing the likelihood that new user data overwrites the old user data at the point where the easy run occurs even if the new user data is the same as the old user data.

The recording system has at least two scrambler seed values available to choose from, and the last seed value used to scramble user data for writing to a particular sector is recorded. A processor of a read channel might store the scrambler seed value along with other record cycle information for the data sector. Alternatively, the data pattern used for the balance pad field could be used to indicate the scrambler seed value. For example, whenever the 2T pattern is used for the balance pad, a first scrambler seed value could be used for the user data field. Similarly, whenever the 3T pattern is used for the balance pad, a second, different scrambler seed value could be used for the user data field. In this way, detecting the data pattern stored in the balance pad field can be used to determine both the balance-pad pattern and the scrambler seed value to use for the new set of data.

Figure 4:
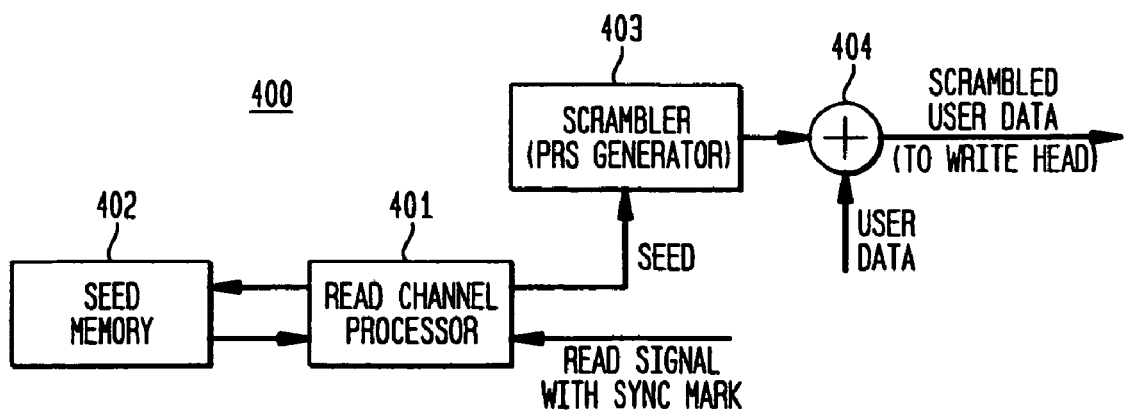
FIG. 4 shows a block diagram of a scrambler operating in accordance with a second exemplary embodiment of the method of FIG. 2.

FIG. 4 shows block diagram of a scrambling circuit 400 operating in accordance with a second exemplary embodiment of the method of FIG. 2. Scrambling circuit 400 includes read channel processor 401, seed memory 402, scrambler 403, and combiner 404. Read channel processor 401 processes the signal read back from the recording medium by a read/write head (not shown in FIG. 4). The read signal includes a sync mark that is detected by read channel processor 401. Based on the detected sync mark for a data sector, read channel processor 401 retrieves a new scrambler seed from seed memory 402 and provides the new seed to scrambler 403. Scrambler 403 (which may be a pseudo-random sequence generator) then provides a scrambling bit sequence to combiner 404, which is typically an XOR gate. Combiner 404 combines i) the scrambling bit sequence with ii) the user data to provide the scrambled user data that the read/write head records at the data sector.

Figure 5:
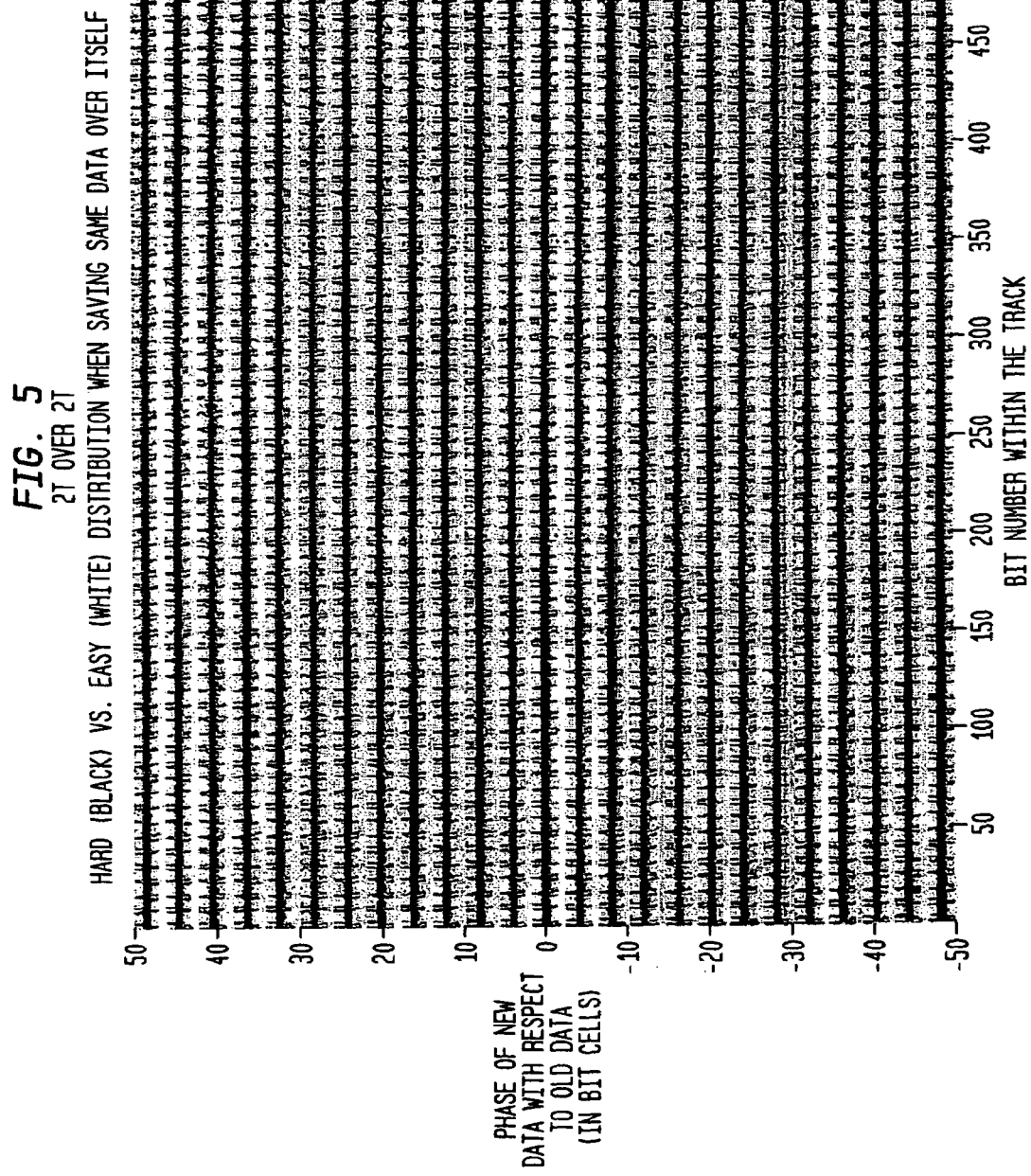
FIG. 5 shows an exemplary track for a simulation in which a 2T pattern is written over a 2T pattern.
Figure 6:
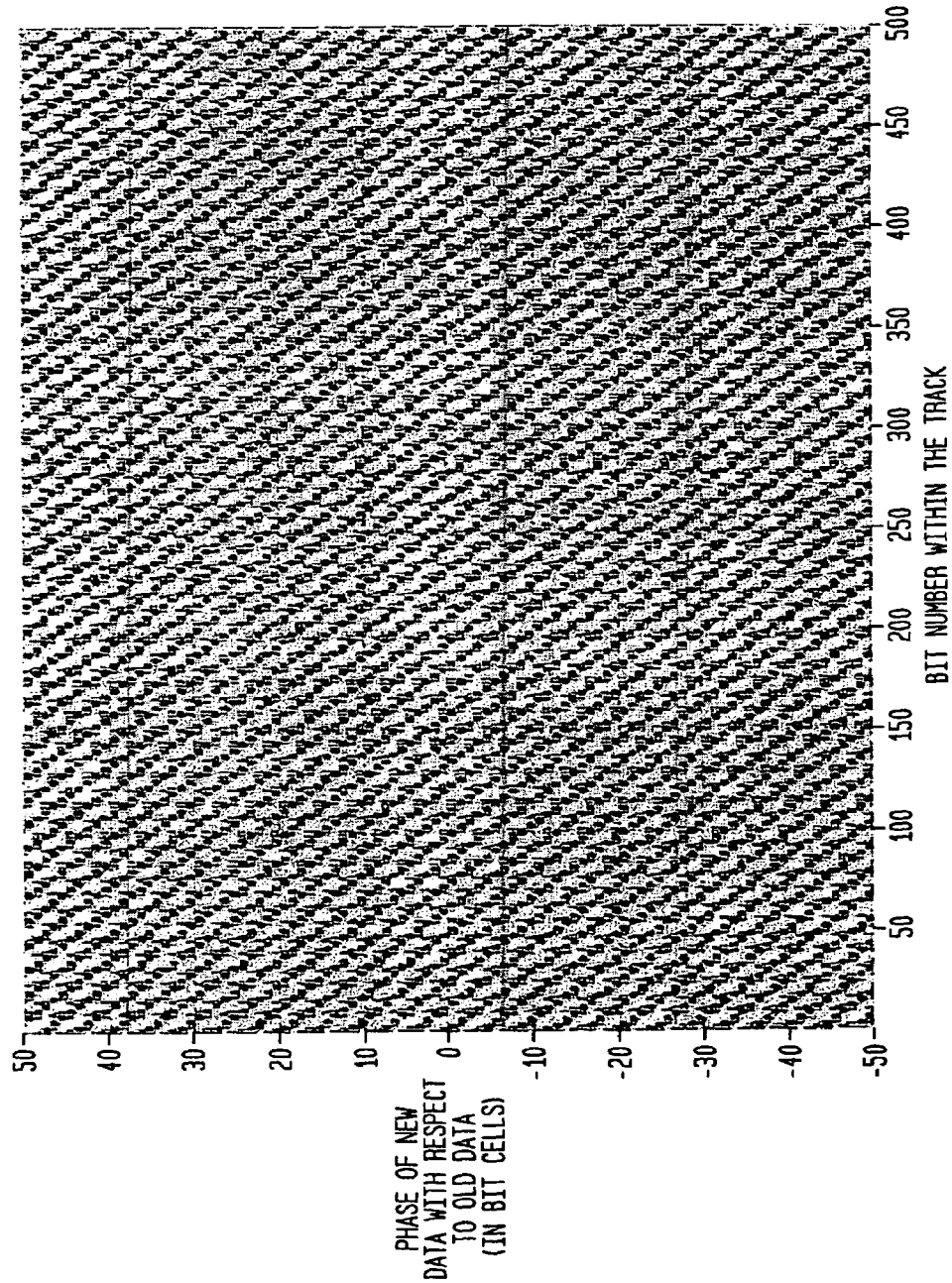
FIG. 6 shows an exemplary track for a simulation in which a 2T pattern is written over a 3T pattern.
Figure 7:
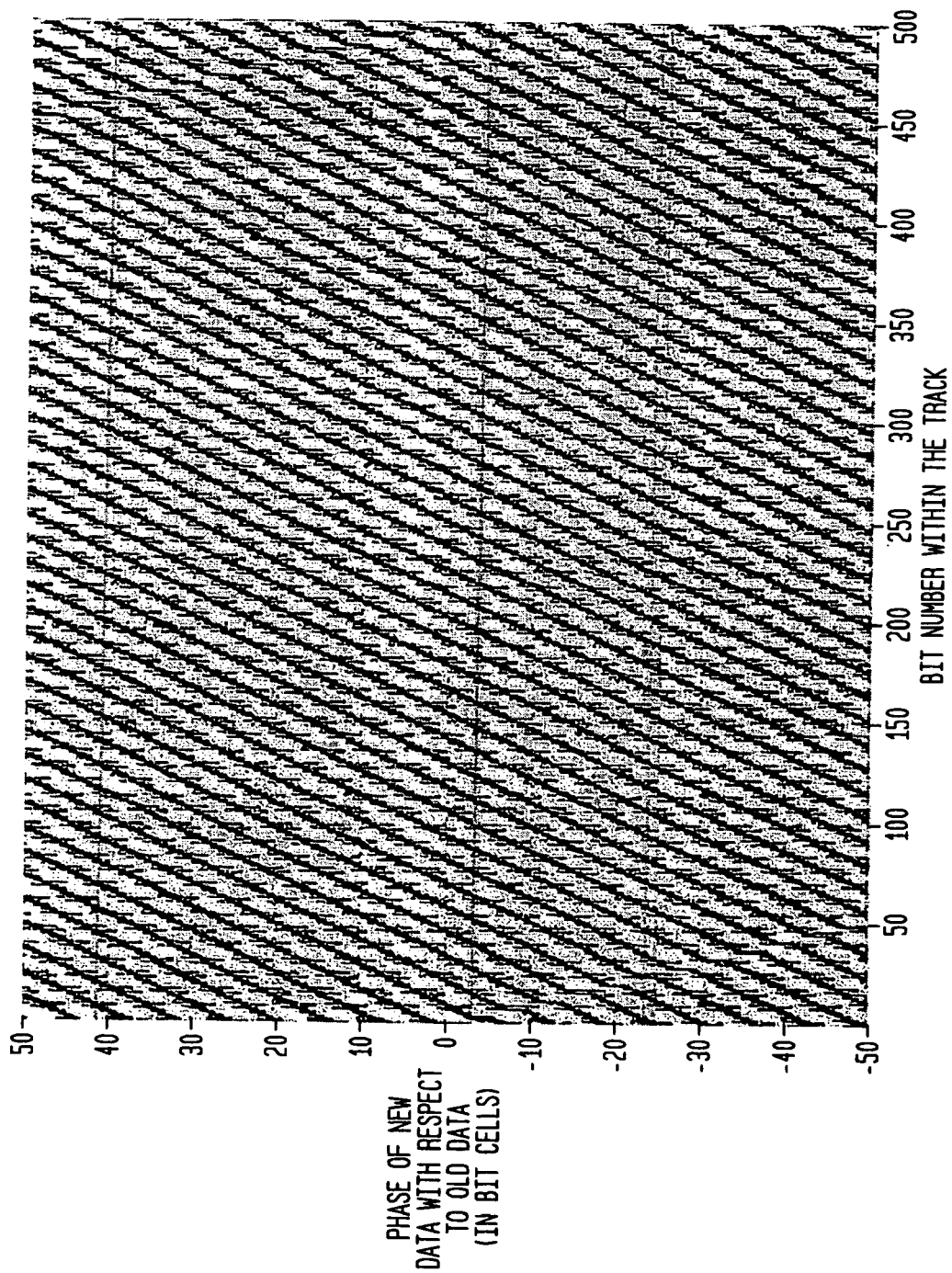
FIG. 7 shows an exemplary track for a simulation in which a 3T pattern is written over a 2T pattern.

Performance of a system of the prior art and of an implementation operating in accordance with one or more exemplary embodiments of the present invention might be simulated and the results compared. FIG. 5 shows an exemplary track for a simulation in which a 2T pattern is written over a 2T pattern, thus illustrating runs of hard and easy transitions when employing methods of the prior art. FIG. 6 shows an exemplary track for a simulation in which a 2T pattern is written over a 3T pattern; and FIG. 7 shows an exemplary track for a simulation in which a 3T pattern is written over a 2T pattern. The exemplary tracks of FIGS. 6 and 7 illustrate the balance of hard and easy transitions when employing the first exemplary embodiment of the present invention. FIG. 8 shows an exemplary track for a simulation in which a random seed is employed to overwrite random data with new random data.

As would be apparent to one skilled in the art, a recording system might employ both a balance pad field in accordance with the first exemplary embodiment in conjunction with seed alternating for recording of user data.

Overwriting data in accordance with an exemplary embodiment of the present invention allows for the following advantages. By employing a balance pad field and/or multiple seed values to record data, read channel sample timing tends toward an average between easy and hard transition timing. When sample timing is within the average between easy and hard transition timing, SNR tends to higher values and bit error rates tend to lower values. Thus, overall system performance is improved over prior art systems.

While the present invention has been described with respect to exemplary embodiments of a magnetic recording system, the present invention is not so limited. One skilled in the art might extend the teachings herein to other types of recording systems, such optical recording systems.

While the exemplary embodiments of the present invention have been described with respect to a method and/or system with block diagrams, the various functional elements of the present invention may be implemented with circuits or may be implemented in the digital domain as processing steps in a software program. Such software may be employed in, for example, a digital signal processor, dedicated logic circuit, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for recording a new set of data over an old set of data at a data sector of a recording medium, the method comprising:
   (a) determining a set of recording cycle information used to record the old set of data;
   (b) selecting a different set of recording cycle information for the new set of data; and
   (c) recording the new set of data at the data sector using the different set of recording cycle information, wherein:
      the data sector comprises a balance pad field;
      the set of recording cycle information includes a first balance-pad pattern used to record the old set of data; and
      the different set of recording cycle information includes a second balance-pad pattern, different from the first balance-pad pattern, for use in recording the new set of data.

2. The invention of claim 1, further comprising storing the different set of recording cycle information.

3. The invention of claim 1, wherein the data sector comprises a sync field, followed by the balance pad field, followed by a user data field.

4. The invention of claim 1, wherein:
   the first balance-pad pattern is one of a 2T pattern and a 3T pattern; and
   the second balance-pad pattern is the other of the 2T pattern and the 3T pattern.

5. The invention of claim 1, wherein the first balance-pad pattern is determined by detecting an old data pattern stored in the balance pad field.

6. The invention of claim 1, wherein:
   the set of recording cycle information includes a first scrambler seed value used to record the old set of data; and
   the different set of recording cycle information includes a second scrambler seed value, different from the first scrambler seed value, for use in recording the new set of data.

7. The invention of claim 6, wherein the data sector comprises a sync field, followed by the balance pad field, followed by a user data field.

8. The invention of claim 7, wherein the first balance-pad pattern and the first scrambler seed value are determined by detecting an old data pattern stored in the balance pad field.

9. The invention of claim 1, wherein the recording medium is a magnetic hard drive disk.

10. The invention of claim 1, wherein the method is implemented by a processor in a channel component of a recording system.

11. An apparatus for recording a new set of data over an old set of data at a data sector of a recording medium, the apparatus comprising:
   (a) means for determining a set of recording cycle information used to record the old set of data;
   (b) means for selecting a different set of recording cycle information for the new set of data; and
   (c) means for recording the new set of data at the data sector using the different set of recording cycle information, wherein:
      the data sector comprises a balance pad field;
      the set of recording cycle information includes a first balance-pad pattern used to record the old set of data; and
      the different set of recording cycle information includes a second balance-pad pattern, different from the first balance-pad pattern, for use in recording the new set of data.

12. A channel component for a recording system for recording a new set of data over an old set of data at a data sector of a recording medium of the recording system, the channel component comprising:
   a write head adapted to write the new set of data over the old set of data at the data sector of the recording medium; and
   a write driver adapted to control operations of the write head, wherein the write driver is adapted to:
      (a) determine a set of recording cycle information used to record the old set of data;
      (b) select a different set of recording cycle information for the new set of data; and
      (c) control the write head such that the new set of data is recorded at the data sector using the different set of recording cycle information, wherein:
         the data sector comprises a balance pad field;

the set of recording cycle information includes a first balance-pad pattern used to record the old set of data; and the different set of recording cycle information includes a second balance-pad pattern, different from the first balance-pad pattern, for use in recording the new set of data.

13. The invention of claim 12, further comprising storing the different set of recording cycle information.

14. The invention of claim 12, wherein the data sector comprises a sync field, followed by the balance pad field, followed by a user data field.

15. The invention of claim 12, wherein:

the first balance-pad pattern is one of a 2T pattern and a 3T pattern; and the second balance-pad pattern is the other of the 2T pattern and the 3T pattern.

16. The invention of claim 12, wherein the first balance-pad pattern is determined by detecting an old data pattern stored in the balance pad field.

17. The invention of claim 12, wherein:

the set of recording cycle information includes a first scrambler seed value used to record the old set of data; and the different set of recording cycle information includes a second scrambler seed value, different from the first scrambler seed value, for use in recording the new set of data.

18. The invention of claim 17, wherein the data sector comprises a sync field, followed by the balance pad field, followed by a user data field.

19. The invention of claim 18, wherein the first balance-pad pattern and the first scrambler seed value are determined by detecting an old data pattern stored in the balance pad field.

20. The invention of claim 12, wherein the recording medium is a magnetic hard drive disk.

* * * * *